United States Patent
Anderson

[15] 3,660,984

[45] May 9, 1972

[54] STABILIZING SOILS

[72] Inventor: Amos R. Anderson, Adrian, Mich.

[73] Assignee: Joseph J. Packo

[22] Filed: July 10, 1970

[21] Appl. No.: 54,012

[52] U.S. Cl. ............................................................61/36 R
[51] Int. Cl. ....................................................E02d 3/14
[58] Field of Search................61/36 R, 35; 166/294, 295, 166/300

[56] References Cited

UNITED STATES PATENTS

| | | | |
|---|---|---|---|
| 2,265,962 | 12/1941 | Bent et al. | 166/294 X |
| 2,270,006 | 6/1942 | Kennedy | 166/294 |
| 3,070,161 | 12/1962 | Kerver et al. | 166/294 X |
| 3,195,273 | 7/1965 | Scott et al. | 61/36 R |
| 3,221,814 | 12/1965 | Hower | 166/295 |

Primary Examiner—Stephen J. Novosad
Attorney—Hugo E. Weisberger

[57] ABSTRACT

Unstable and permeable soils are stabilized or solidified by a chemical treatment with a soil-stabilizing agent comprising two components: (1) a metal alkyl or metal alkyl hydride or a metal alkyl halide, the metal being aluminum, zinc, indium, gallium or thallium, such as zinc diethyl or aluminum triethyl, and (2) a liquid or solid organo compound of a tetravalent metal such as silicon, titanium, zirconium or hafnium, such as an alkyl alkoxy silane, whereby these components react in presence of soil moisture to form in situ a solid reaction product binding the soil particles; the stabilizing agent may be introduced into the soil by injection, or applied by surface treatment such as spraying or rolling.

19 Claims, No Drawings

STABILIZING SOILS

BACKGROUND OF THE INVENTION

The present invention relates to a novel method of stabilizing or solidifying unstable soils by chemical treatment.

Certain types of soils present problems of instability when subjected to loads, or when excavated for the foundations of building, roadways, and other kinds of surface structures. This instability may arise from the loose or pervious character of the soil components, or from the presence of finely divided clay which serves to weaken the soil by decreasing its load-bearing ability and cohesion, particularly where significant amounts of moisture are encountered. Soils composed of loose sand or gravel, or of porous rock formations or layers will generally not provide adequate support for surface structures, owing to their water-permeability, and they may present water seepage and penetration problems even after the structure is in place. Such surface structures include not only buildings, but also highways, airfields and runways, railway beds, and the like.

Loose and porous or unconsolidated soils may also present difficulties of instability at or below the surface, when subjected to excavation for building foundations, boring of tunnels, sinking of mine shafts and drifts, construction of dams, the cutting of banks along highways, treatment of banks of waterways, canals, reservoirs, and irrigation ditches, and the drilling of oil and other kinds of wells. When new cuts are made in these operations, exposed soil surfaces are subject to wind and/or water erosion, or to effect of percolating ground waters.

Thus soil stabilization is broadly the operation of hardening or solidifying natural soils, particularly loose or unconsolidated soils, so as to effect a stabilization of the soil particles through bonding of the particles and/or filling up and tightening voids or fissures, or by solidifying the soil, so as to retard or prevent undesired soil movement and susceptibility to the action of the surface and underground waters. In this way, the natural deficiencies of the soil are corrected, erosion and landslides are minimized, and the supporting strength of the soil is greatly improved.

The prior art contains numerous approaches to the solution of the problem of soil stabilization, especially that of chemical treatment. Among the treating agents which have been proposed are inorganic chemicals, such as molten sulfur, reaction products of alkalis, such as ammonia with silicic acid, asphalts and bituminous emulsions, natural resins, organic colloids such as waste sulfite liquor, synthetic resins, and the injection of halides of silicon or titanium to form corresponding oxides in the interstices of the soil. Each of these prior art approaches has inherent disadvantages, as the result of which few, if any, have won significant acceptance.

GENERAL DESCRIPTION OF THE INVENTION

In accordance with the present invention, an unstable soil having a permeable structure is stabilized or solidified by admixing with the soil a soil-stabilizing agent comprising (1) a metal compound which is a metal alkyl, metal alkyl halide, or metal alkyl hydride, and (2) an organo compound of a metal of Group IV of the periodic system. The metal compound (1) is advantageously a normally gaseous or volatilizable liquid. The organo compound (2) may be a volatile or volatilizable liquid or solid.

The components of the soil-stabilizing agent of the invention, upon exposure to the soil, will react with the moisture or free oxygen present and form a solid binder which hardens the soil and holds the particles of soil together in a firm bond. The choice of stabilizer components will be determined by the type, porosity, and moisture content of the soil, the location of the soil strata, the purpose for which the soil is to be improved, and other factors.

The soil stabilizer components may be supplied to the soil to be stabilized either in admixture, or successively, and one or more of each type of component may be employed.

Advantageously, the soil-stabilizing agent is applied to a predetermined zone of the soil either by injection or by surface treatment, with either the gaseous forms or solutions of the components being employed. The amount of stabilizing agent used should be enough to fill the pores and to assure an even and uniform distribution.

Where injection is used to introduce the stabilizing agent, the active ingredients can be fed into the soil, under pressure, through a long pipe or lance which may penetrate to any desired depth. This may vary from a few feet in depth to hundreds or even thousands of feet. For more elaborate treatments or several injection zones simultaneously, a system of multiple injection tubes may be used, which may be simple pipes, or which may incorporate an auger to remove loose soil material as the tube is lowered into the soil to the desired depth. The stabilizer components may also be introduced via the injection tubes in the form of solutions, for example, in volatile petroleum hydrocarbons. Thus, in consolidating sand formations in an oil or gas well borehole, the stabilizer ingredient solutions may be applied at the desired point by means of a mixing nozzle which forces the mixture into the selected sand formation. On the other hand, where the object is to effect rapid surface stabilization, as for an emergency landing air strip, the mixture in solution can be applied by spraying and allowed to penetrate, there to react and to form a solid reaction product.

Where the stabilizing agent components are volatilizable liquids, they may be admixed with a non reactive vehicle gas such as nitrogen, helium, or hydrogen, and introduced under pressure into the soil with improved penetration into the soil interstices.

The proportion of the metal alkyl, metal alkyl halide, or metal alkyl hydride component to the organo compound of the metal of Group IV of the periodic system is that which is effective to produce the desired solid reaction product, and may range by volume from about 1 percent to about 99 percent, the remainder being the organo compound.

The stabilizer components are allowed to remain in contact with the treated soil for a period of time sufficient to effect formation of a solid binding material so that the soil exhibits the required stability.

The following discussion of the various categories of stabilizing agent components and their properties, and the various exemplifications thereof, are intended to provide a better understanding of the practice of the invention, but the examples given are not to be considered as limiting the invention thereto.

METAL ALKYLS

There may be employed, in accordance with the invention, alkyls of metals of divalent metals of Group II B of the periodic system, example of such metals being zinc and cadmium. These divalent metal alkyls will have the formula:

$$MRR'$$

wherein M is zinc or cadmium, and R and R' are identical or different straight or branched chain alkyl having one to eight carbon atoms. These compounds are liquid at ordinary temperature, they decompose on contact with moisture, and many are strongly pyrophoric. Examples include: dimethyl zinc, b. 46° C., diethyl zinc, b. 118° C., vapor pressure 30 mm. Hg at 27° C., di-n-propyl zinc, b. 160° C., vapor pr. 48 mm. Hg at 10° C., di-isopropyl zinc, ethyl-n-propyl zinc, n-propyl-n-butyl zinc, methyl ethyl zinc, di-n-butyl zinc, di-isobutyl zinc, isobutyl-isoamyl zinc, di-isoamyl zinc, methyl propyl zinc, and dioctyl zinc.

Corresponding cadmium alkyls include dimethyl cadmium, b. 105° C., diethyl cadmium, and di-isobutyl cadmium.

There may also be utilized for this component of the stabilizing agent of the invention, alkyls of trivalent metals of Group III A of the periodic system, such metals including aluminum, indium, gallium, and thallium. These trivalent metal alkyls will have the formula:

$$XR_3$$

wherein X is aluminum, indium, gallium or thallium, and R is identical or different straight or branched chain alkyl having one to 10 carbon atoms. These compounds are liquid at ordinary temperature, many are pyrophoric, and they decompose on contact with water and/or air. Examples of aluminum alkyls include: trimethyl aluminum, b. 126° C., triethyl aluminum, b. 207° C., tri-n-propyl aluminum, triisopropyl aluminum, b. 225° C., tri-n-butyl aluminum, triisobutyl aluminum, tri-n-hexyl aluminum, tris(isohexyl) aluminum, tris(2-methyl-pentyl) aluminum, tri-n-octyl aluminum, and tri-n-decyl aluminum; also methyl diethyl aluminum, dimethyl ethyl aluminum, and methyl di-isopropyl aluminum.

Similar alkyls of gallium which may be used include trimethyl gallium, b. 55.7° C., triethyl gallium, b. 143° C., and tetramethyl di-galline $(CH_3)_2$—Ga—Ga—$(CH_3)_2$, b. 172° C.

Alkyls of indium include: trimethyl indene, b. 135.8° C., triethyl-indene, b. 144° C., and tripropylindene, b. 178° C.

Alkyls of thallium include: trimethyl-thallane, b. 147° C.

METAL ALKYL HYDRIDES

These are compounds of trivalent metals of Group III A of the periodic system, and are mainly compounds in which the metal is aluminum, having the formula:

$$r_n—M—H_{3-n}$$

wherein M is a trivalent metal such as aluminum, R is straight or branched chain alkyl having one to eight carbon atoms, and $n$ is 1 or 2.

These compounds are normally liquids, mainly pyrophoric, which are attacked by water. Examples include: aluminum diethyl hydride, di-isobutyl aluminum hydride, b. 225° C., and the mixed hydride $[(CH_3)_2AlH)] [(CH_3AlH_2)]$.

METAL ALKYL HALIDES

These are compounds of trivalent metals of Group III A of the periodic system, and are mainly compounds in which the metal is aluminum, having the formula:

$$R_n—M—Hal_{3-n}$$

wherein M is a trivalent metal such as aluminum, R is straight or branched chain alkyl having one to eight carbon atoms, and $n$ is 1 or 2, and Hal is chlorine, bromine, fluorine or iodine.

These are also normally liquids, mainly pyrophoric, and are attacked by water. Examples include: ethyl aluminum sesquichloride, diethyl aluminum chloride, b. 208° C., vapor pr. 41 mm. Hg at 12° C., ethyl aluminum dichloride, m. 22° C., b. 194° C., vapor pr. 41 mm. Hg at 12° C., diethyl aluminum chloride etherate $(C_2H_5)_2Cl—Al—(C_2H_5O)_2$, dimethyl aluminum chloride, methyl aluminum sesquichloride $Al_2(CH_3)_3Cl_3$, b. 127°-148° C., di-isobutyl aluminum chloride, isobutyl aluminum dichloride, diethyl aluminum iodide, vapor pr. 4 mm. Hg at 118° C., diethyl aluminum fluoride, vapor pr. 1 -2 mm. Hg at 90° -100° C., and ethyl isobutyl aluminum chloride.

ORGANOMETAL COMPOUNDS

The second component of the stabilizing agent of the invention is a liquid or solid organo compound of a tetravalent metal of group IV of the periodic system, such metals including silicon, titanium, zirconium, and hafnium. These compounds are liquids or solids, but are not pyrophoric, and they are reactive with moisture. They have the general formula:

$$R_{4-n}M(OR')_n$$

wherein R and R' is a straight or branched chain alkyl having one to 12 carbon atoms, all the alkyls being identical or different, and $n$ is an integer from 1 to 4.

Where the metal is silicon, the organo compounds are classed as organosilanes, a grouping which includes organosilicon alkoxides and silicon tetra alkoxides (esters of silicic acid). The organosilicon alkoxides and silicon tetra alkoxides which may be utilized in accordance with the invention include, for example: trimethyl ethoxy silane, b. 75.6° C. at 738 mm. Hg, methyl trimethoxy silane, b. 102°-103° C., dimethyl dimethoxy silane, b. 81° C., at 748 mm., trimethyl methoxy silane, b. 55.5° C. at 740 mm., dimethyl diethoxy silane, b. 113°-114° C., N-propyl trimethoxy silane, b. 100.5° C. at 735 mm., methyl tripropoxy silane, b. 192° C., methyl triisopropoxy silane, b. 161°-162° C., di-isopropoxy dimethoxy silane, di-isopropyl diethoxy silane, b. 187.2° C., di-n-propyl diethoxy silane, b. 190.5° C., diethyl diethoxy silane, b. 160° C., ethyl triethoxy silane, b. 160° C., trimethyl n-butoxy silane, b. 124° C., at 740 mm., trimethyl isobutoxy silane, b. 114.6° C. at 742 mm., trimethyl s-butoxy silane, b. 112.3° C., trimethyl tert-butoxy silane, b. 101° C. at 754 mm., di-n-butyl dimethoxy silane, triethyl ethoxy silane, b. 153° C., triethyl n-butoxy silane, trimethyl n-decyloxy silane, b. 272° C., at 742 mm., methyl tri-n-amyloxy silane, trimethyl heptyloxy silane, b. 189° C. at 740 mm., triethyl n-butoxy silane, triethyl isobutoxy silane, b. 186.3° C., triethyl s-butoxy silane, b. 187° C., triethyl tert-butoxy silane, b. 177° C., di-n-butyl dimethoxy silane, b. 205.4° C., di-n-butoxy dimethyl silane, b. 187°-190° C., dimethyl di-isobutoxy silane, b. 174° C., n-butyl triethoxy silane, b. 197° C., isobutyl triethoxy silane, b. 180°-192° C., dimethoxy dibutoxy silane, butoxy triethoxy silane, tert-butoxy triethoxy silane, tetramethoxy silane, b. 121° C., tetraethoxy silane, b. 168° C., tetra-isopropoxy silane, b. 185.5° C., and tetrakis (2-ethoxy ethoxy) silane, b. 312° C.

Organotitanium derivatives of the same type which are utilizable include various alkyl titanates, such as, for example: isopropyl titanate, b. 235° C., isobutyl titanate, b. 163° C. at 13 mm. Hg, isooctyl titanate, b. 219° C. at 1 mm. Hg, n-nonyl titanate, b. 264° C. at 1-5 mm. Hg, n-heptyl titanate, b. 201° C. at 0.1 mm. Hg., and n-butyl titanate, b. 310°-314° C.

Organozirconium derivatives which may be employed include zirconium alkoxides such as isopropyl zirconate, b. 160° C., at 0.1 mm., n-butyl zirconate, b. 256° C. at 0.01 mm., 4-heptyl zirconate, 5-nonyl zirconate, 2-pentyl zirconate, and tetra-ethyl zirconate, b. 180° C. at 0.1 mm.

An example of a hafnium compound of this type is Hf(tert.-amyl)$_4$ oxide.

While the proportion of the silane or equivalent organometal compound may range from about 1 percent to about 99 percent by weight, it is preferred to keep the metal alkyl (or metal alkyl hydride or metal alkyl halide) concentration below about a level at which the stabilizing composition as a whole will become pyrophoric, as such compositions would be difficult to handle. Thus the organometallic compound such as the silane is preferably in a concentration between about 65 percent and 85 percent by weight of the combined components, and the metal alkyl component is preferably kept below about 30 percent in most instances, to avoid problems of spontaneous flammability.

While not wishing to be bound by any particular theory, it is believed that the components of the stabilizing agent, activated by minor amounts of moisture or air present in the soil, undergo complex interchange reactions to form the sealant product.

The two (or more) components of the stabilizing agent of the invention may be introduced into the soil to be stabilized as a liquid mixture, either by injection or by surface rolling or spraying, as the situation warrants.

A preferred mixture for use as a soil stabilant is a liquid mixture of about 20 percent diethyl zinc and about 80 percent tetraethoxy silane (tetraethyl orthosilicate), by weight. Other desirable mixtures are illustrated as well in the accompanying examples.

The application of the stabilizing composition of the invention to unstable soil results in rapid hardening with the formation of a solid binder in situ in the soil, holding the soil particles together in a firm bond.

Where the stabilizing mixture is applied by surface treatment, erosion is reduced or eliminated, and a hardened crust is formed over an area the size of which is predetermined by prior tests to ascertain the amount of treating agent needed. The proportion of active ingredients may range from as little as 0.1 percent based on the weight (dry) of the soil up to 10–15 percent or more, depending upon soil porosity and other factors. The stabilizing liquid can be applied in solution in volatile solvents, or even in admixture with other binders, such as, for example, cut-back asphalt. This mode of application is especially suited to the construction or maintenance of highways, railway beds, highway cuts, dams, irrigation ditches, sea shore lines, dikes, air strips, waterways, canals, reservoirs, and the like.

Application of the stabilizing agent of the invention by injection methods is appropriate in connection with oil well structures, oil recovery and storage facilities, so-called "mud pies" or earthen gas storage chambers sealed with a fabricated top, natural formations, building foundations, mine shafts and drifts, stoping, and the like.

DESCRIPTION OF THE PREFERRED EMBODIMENTS

The following examples serve to illustrate the practice of the invention, but are not to be regarded as limiting:

EXAMPLE 1

A series was prepared of 100 cc samples of soils or soil-like materials, as follows: mica, fine sand, coarse sand, silica powder, fine clay, coarse clay, mixed loam, humus, limestone powder, fine talc, titanium dioxide, bentonite, gravel-clay mix, natural soil composed of yellow clay, or containing a sandy loam, or mixed gravel. These materials provided various soil conditions, such as moisture content, lime, acidity, and particle size range.

Each of the samples was injected with 3 ml of a liquid mixture of 20 percent diethyl zinc and 80 percent tetraethoxy silane, by weight, using as a lance a standard hypodermic needle. The amount thus injected averaged about 15 percent by weight of the material treated, although in the case of some of the very light materials, the proportion was about 5 percent by weight.

In each case the material treated, within a period of a few seconds to minutes, hardened to a solid, impervious approximately spherical formation contiguous to the outlet of the lance. The treated material exhibited increased specific gravity and crush strength. For example, mason's sand treated as above gave crush strength of 100 lbs./sq. in.

EXAMPLE 2

Following the procedure explained in Example 1, a similar series of tests was run with a mixture of 20 percent by weight of triethyl aluminum and 80 percent by weight of propyl trimethoxy silane. Injection of this mixture into 100 parts of moist sand, for example, resulted in hardening in a few minutes.

EXAMPLE 3

Proceeding as in Example 1, tests were run with a mixture of 20 percent zinc diethyl and 80 percent isopropyl titanate, with similar results.

EXAMPLE 4

Proceeding as in Example 1, tests were run with a mixture of 5 percent zinc diethyl and 13 percent isopropyl zirconate dissolved in 82 percent toluene, with similar results.

EXAMPLE 5

In order to ascertain the effect of varying proportions of moisture on hardening rate, 100 gram samples of dry sand were admixed, respectively, with 0.1, 0.2, 0.5, 1.0, 2.0, 3.0, 4.0 and 5.0 parts of water, each sample then being injected with 3 ml. of a liquid mixture of 20 percent zinc diethyl and 80 percent tetra-ethoxy silane, as in Example 1. All samples eventually formed a hard structure, but the time required was inversely proportional to the moisture content. In the case of the very dry sand, the structure took the form of a geode exhibiting a soft interior. However, where the moisture content was above 0.1 percent, hardening took place within minutes. The degree of packing of the particles also influenced the hardening rate.

What is claimed is:

1. A method of stabilizing an unstable soil having a permeable structure which comprises introducing into the soil a stabilizing amount of a soil-stabilizing agent comprising (1) a metal compound selected from the group consisting of a metal alkyl, a metal alkyl halide, and a metal alkyl hydride, and (2) an organo compound of a tetravalent metal of Group IV of the periodic system, and allowing the components to react in the presence of soil moisture to form a solid reaction product binding the soil particles.

2. The method of claim 1 in which said stabilizing component (1) is a normally gaseous or volatilizable liquid.

3. The method of claim 1 in which the metal alkyl is a compound of the formula MRR', wherein M is a divalent metal of Group II B of the periodic system, and R and R' are identical or different straight or branched chain alkyl having one to eight carbon atoms.

4. The method of claim 3 in which M is zinc.

5. The method of claim 3 in which M is cadmium.

6. The method of claim 1 in which the metal alkyl is a compound of the formula $XR_3$, wherein X is a trivalent metal of Group III A of the periodic system, and $R_3$ is an identical or different straight or branched chain alkyl having one to 10 carbon atoms.

7. The method of claim 6 in which X is selected from the group consisting of aluminum, indium, gallium, and thallium.

8. The method of claim 1 in which the metal alkyl hydride is a compound of the formula: $R_n—M—H_{3-n}$, wherein M is aluminum, R is straight or branched chain alkyl having one to eight carbon atoms, and $n$ is an integer from 1 to 2.

9. The method of claim 1 in which the metal alkyl halide is a compound of the formula: $R_n—M—Hal_{3-n}$, wherein M is aluminum, R is straight or branched chain alkyl having one to eight carbon atoms, Hal is halogen, and $n$ is an integer from 1 to 2.

10. The method of claim 1 in which said stabilizing component (2) is a volatile or volatilizable liquid.

11. The method of claim 1 in which said stabilizing component (2) is a solid.

12. The method of claim 1 in which the organo compound of a tetravalent metal has the formula: $R_{4-n}M(OR')_n$, wherein R and R' is a straight or branched chain alkyl having one to 12 carbon atoms, all the alkyls being identical or different, M is a tetravalent metal of Group IV of the periodic system, and $n$ is an integer from 1 to 4.

13. The method of claim 12 in which the tetravalent metal is selected from the group consisting of silicon, titanium, zirconium, and hafnium.

14. The method of claim 1 in which the stabilizing agent comprises diethyl zinc and tetra-ethoxy silane.

15. The method of claim 1 in which the stabilizing agent comprises triethyl aluminum and propyl trimethoxy silane.

16. The method of claim 1 in which the stabilizing agent is introduced into the soil by injection.

17. The method of claim 1 in which the stabilizing agent is applied to the soil by surface treatment.

18. The method of claim 1 in which the soil stabilizing agent is applied to the soil in a liquid solvent.

19. Stabilized soil obtained by introducing into the soil a stabilizing amount of a soil-stabilizing agent comprising (1) a metal compound selected from the group consisting of a metal alkyl, a metal alkyl halide, and a metal alkyl hydride, and (2) an organo compound of a tetravalent metal of Group IV of the periodic system, and allowing the components to react in the presence of soil moisture to form a solid reaction product binding the soil particles.

* * * * *

UNITED STATES PATENT OFFICE
CERTIFICATE OF CORRECTION

Patent No. 3,660,984            Dated May 9, 1972

Inventor(s) Amos R. Anderson

It is certified that error appears in the above-identified patent and that said Letters Patent are hereby corrected as shown below:

Claim 8, line 2 (column 6, line 32), the formula should read:

$$R_n - M - H_{3-n}$$

Signed and sealed this 5th day of September 1972.

(SEAL)
Attest:

EDWARD M. FLETCHER, JR.　　　　　　　　　　ROBERT GOTTSCHALK
Attesting Officer　　　　　　　　　　　　　　Commissioner of Patents